(12) United States Patent
Rangari et al.

(10) Patent No.: US 11,613,648 B1
(45) Date of Patent: Mar. 28, 2023

(54) NANO ENGINEERED EGGSHELL FLEXIBLE BIOPOLYMER BLEND AND METHODS OF MAKING BIOPOLYMER BLEND FILM AND USING SUCH BIOPLASTIC BLENDS FOR IMPROVED BIODEGRADABLE APPLICATIONS

(71) Applicant: TUSKEGEE UNIVERSITY, Tuskegee, AL (US)

(72) Inventors: Vijaya Rangari, Tuskegee, AL (US); Boniface Tiimob, Tuskegee, AL (US)

(73) Assignee: TUSKEGEE UNIVERSITY, Tuskegee, AL (US)

( * ) Notice: Subject to any disclaimer, the term of this patent is extended or adjusted under 35 U.S.C. 154(b) by 0 days.

(21) Appl. No.: 17/393,315

(22) Filed: Aug. 3, 2021

Related U.S. Application Data

(62) Division of application No. 16/040,250, filed on Jul. 19, 2018, now Pat. No. 11,078,359.

(60) Provisional application No. 62/535,014, filed on Jul. 20, 2017.

(51) Int. Cl.
| | |
|---|---|
| *C08J 3/21* | (2006.01) |
| *C08J 3/14* | (2006.01) |
| *C08J 3/11* | (2006.01) |
| *C08J 3/09* | (2006.01) |
| *C08L 67/02* | (2006.01) |
| *C08L 67/04* | (2006.01) |
| *C08K 5/00* | (2006.01) |
| *C08K 7/00* | (2006.01) |
| *C08L 77/00* | (2006.01) |
| *C08L 89/00* | (2006.01) |
| *C08J 5/18* | (2006.01) |
| *C08J 3/215* | (2006.01) |
| *B82Y 40/00* | (2011.01) |
| *B82Y 30/00* | (2011.01) |

(52) U.S. Cl.
CPC ............... *C08L 67/04* (2013.01); *C08J 3/093* (2013.01); *C08J 3/11* (2013.01); *C08J 3/14* (2013.01); *C08J 3/212* (2013.01); *C08J 3/215* (2013.01); *C08J 5/18* (2013.01); *C08K 5/00* (2013.01); *C08L 67/02* (2013.01); *C08L 77/00* (2013.01); *C08L 89/00* (2013.01); *B82Y 30/00* (2013.01); *B82Y 40/00* (2013.01); *C08J 2367/02* (2013.01); *C08J 2467/04* (2013.01); *C08J 2489/00* (2013.01); *C08K 7/00* (2013.01); *C08K 2201/005* (2013.01); *C08K 2201/011* (2013.01); *C08K 2201/018* (2013.01); *C08L 2201/06* (2013.01); *C08L 2203/16* (2013.01); *C08L 2205/14* (2013.01)

(58) Field of Classification Search
None
See application file for complete search history.

(56) References Cited

U.S. PATENT DOCUMENTS

| | | | |
|---|---|---|---|
| 2014/0323616 A1 | 10/2014 | Liu et al. | |
| 2018/0142073 A1* | 5/2018 | Wu ........................... | C08K 3/34 |
| 2018/0273746 A1 | 9/2018 | Orts et al. | |

FOREIGN PATENT DOCUMENTS

| | | | |
|---|---|---|---|
| CN | 102002187 | 4/2011 | |
| CN | 103131068 | 6/2013 | |
| CN | 106751627 A * | 5/2017 | ................ C08J 5/18 |

OTHER PUBLICATIONS

Machine translation of CN-106751627-A (no date).*

* cited by examiner

*Primary Examiner* — Michael J Feely
(74) *Attorney, Agent, or Firm* — Terry M. Sanks, Esq.; Beusse Sanks, PLLC

(57) ABSTRACT

A biopolymer blend is provided that comprises a combination of three components: poly (butylene adipate-co-terephthalate) (PBAT); agriculture sourced polylactic acid (PLA); and engineered proteinaceous eggshell nanoparticles. The two polymer components can be present in any ratio but an approximate 70:30 ratio is preferred. The engineered proteinaceous eggshell nanoparticles are preferably about 10-25 nanometers. Also provided are methods of preparing biopolymer film and packaging components. Pelleted poly (butylene adipate-co-terephthalate) and agriculture sourced polylactic acid (PLA) are dissolved in chloroform and mixed together to form a polymer blend, and engineered proteinaceous eggshell nanoparticles are incorporated into the polymer blend, which is then extruded to create a biopolymer film or component.

16 Claims, 18 Drawing Sheets

XRD pattern structural analysis of eggshell nanoparticles

FIG. 2A: High Magnification
FIG. 2B Plate-like structure
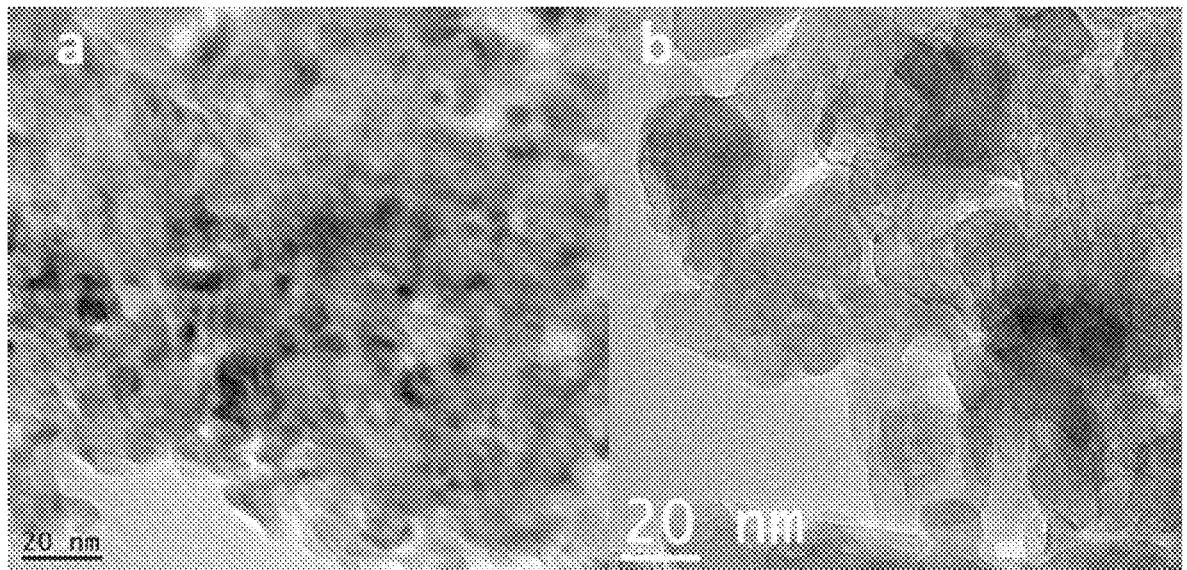
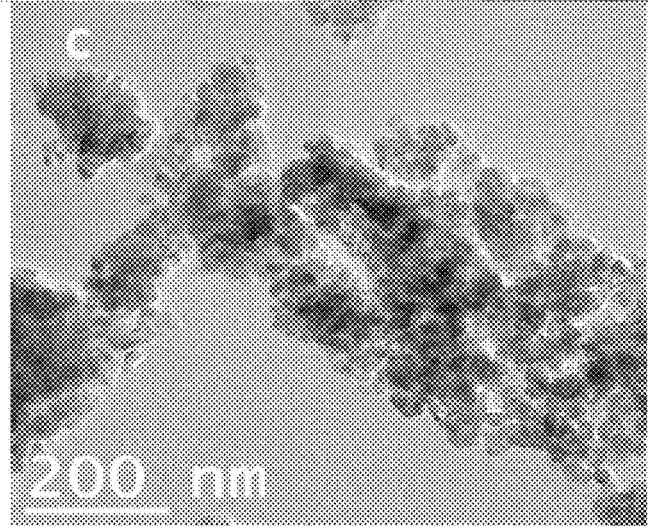
FIG. 2C: Low Magnification

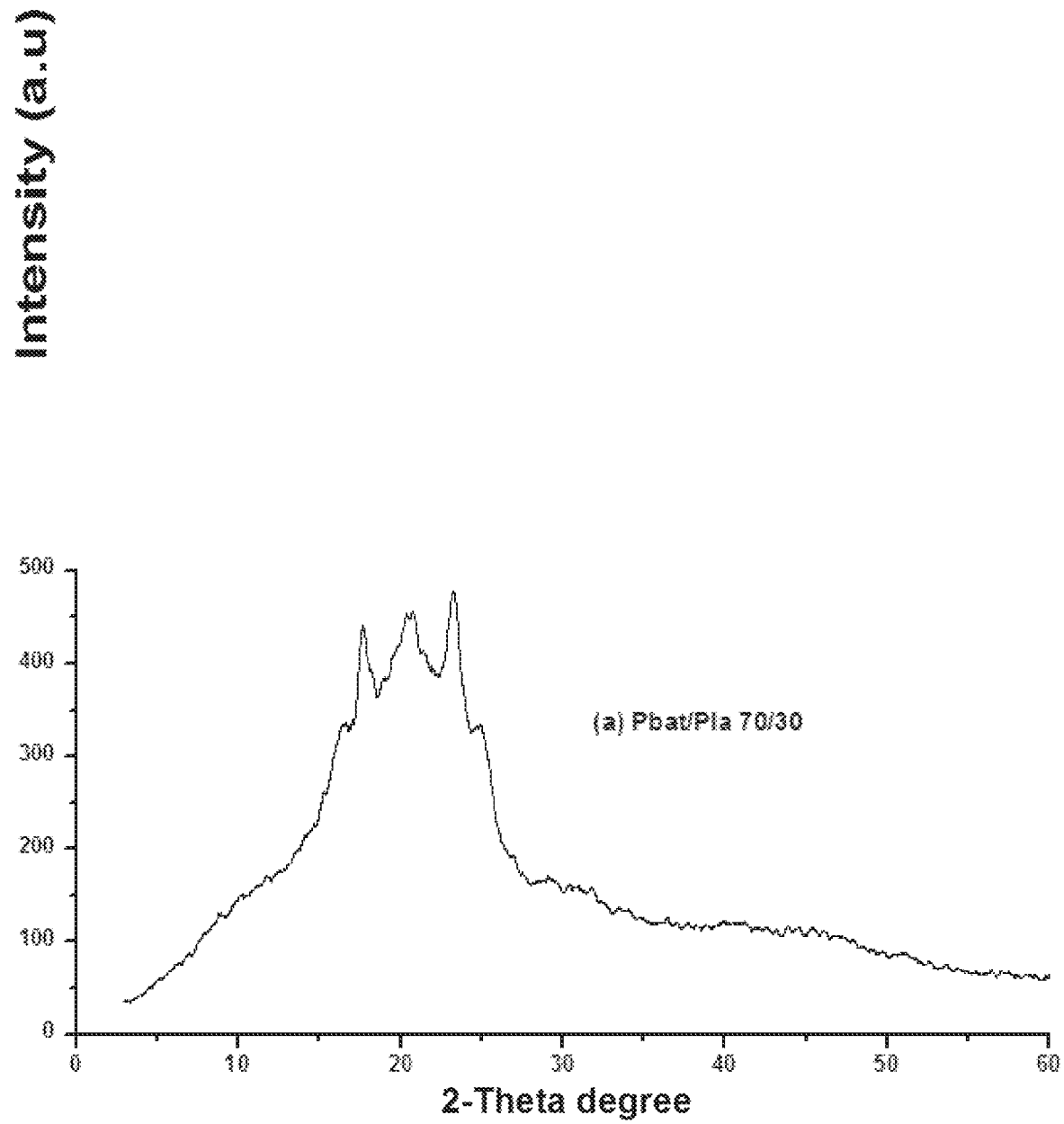
FIG. 3A: Xray diffraction pattern of Pbat/Pla 70/30

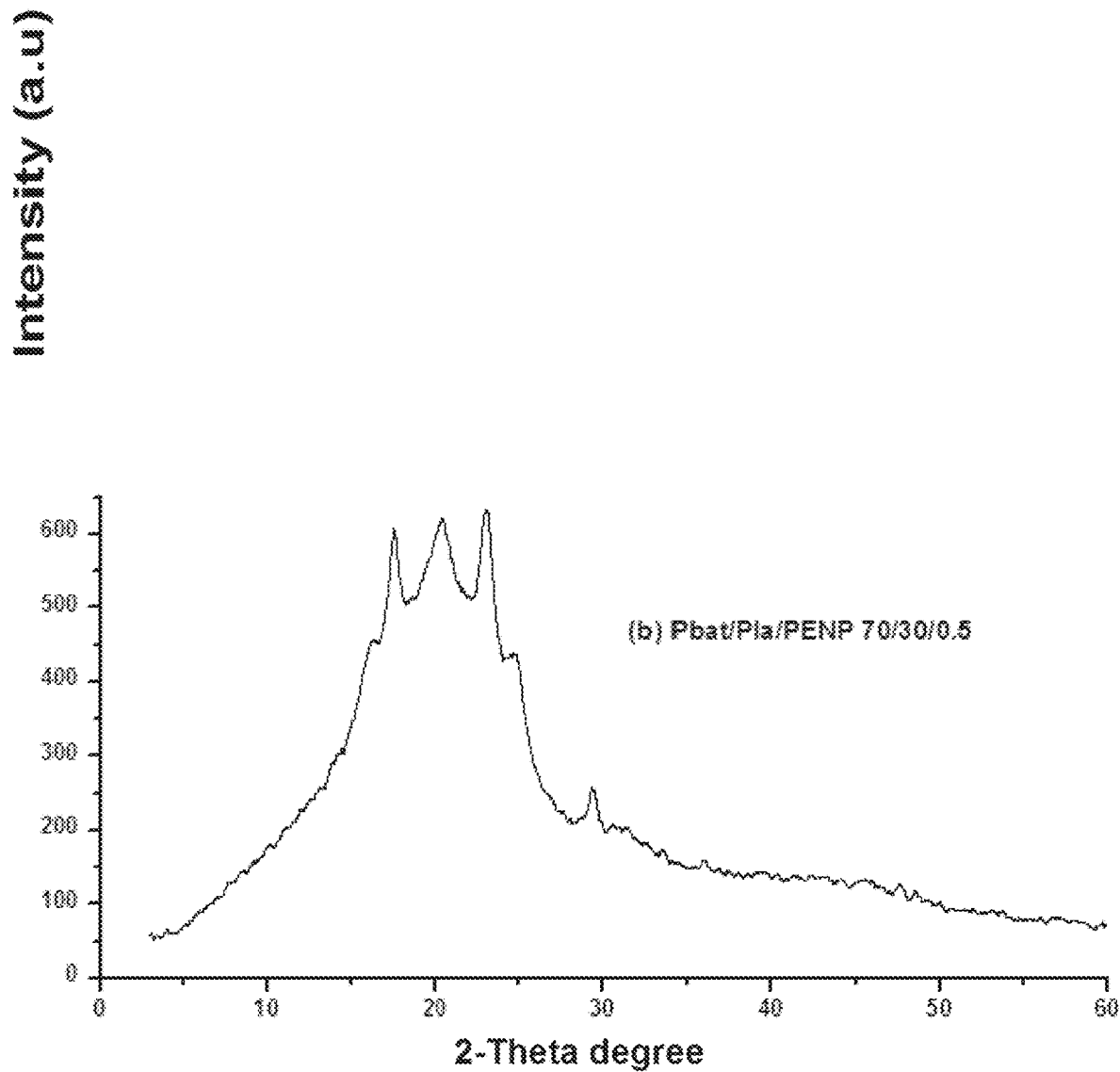
FIG. 3B: Xray diffraction pattern of Pbat/Pla/PENP 70/30/0.5

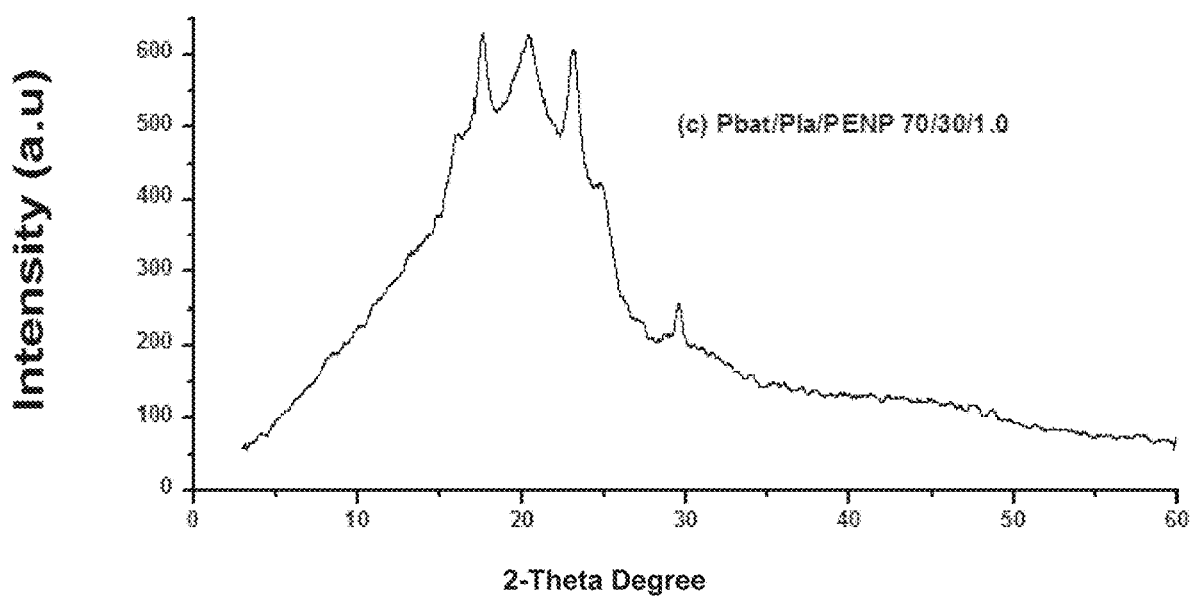
FIG. 3C: Xray diffraction pattern of Pbat/Pla/PENP 70/30/1.0

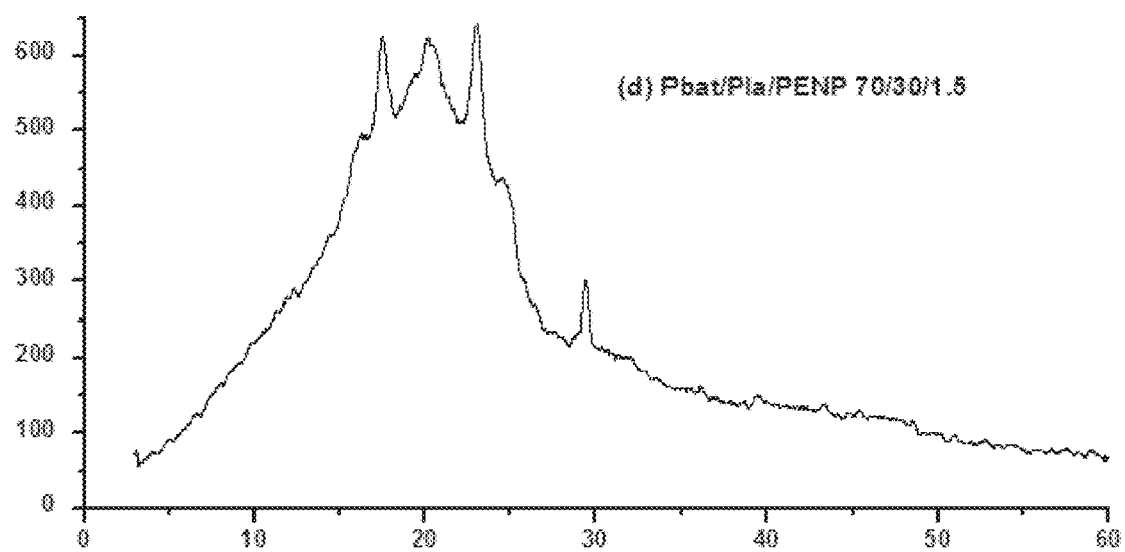
FIG. 3D: Xray diffraction pattern of Pbat/Pla/PENP 70/30/1.5

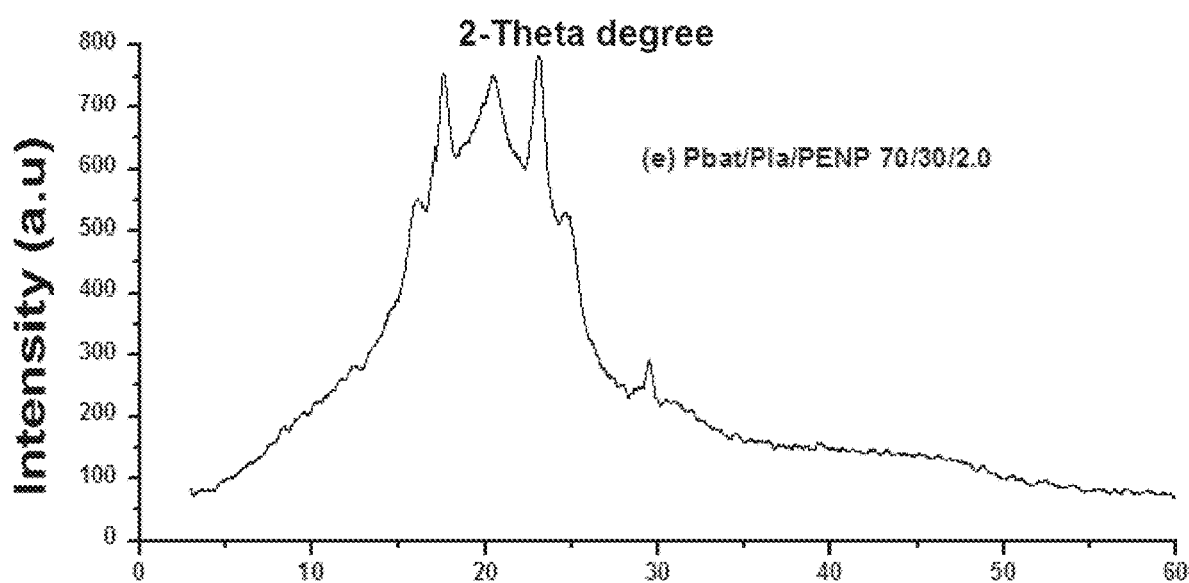
FIG. 3E: Xray diffraction pattern of Pbat/Pla/PENP 70/30/2.0

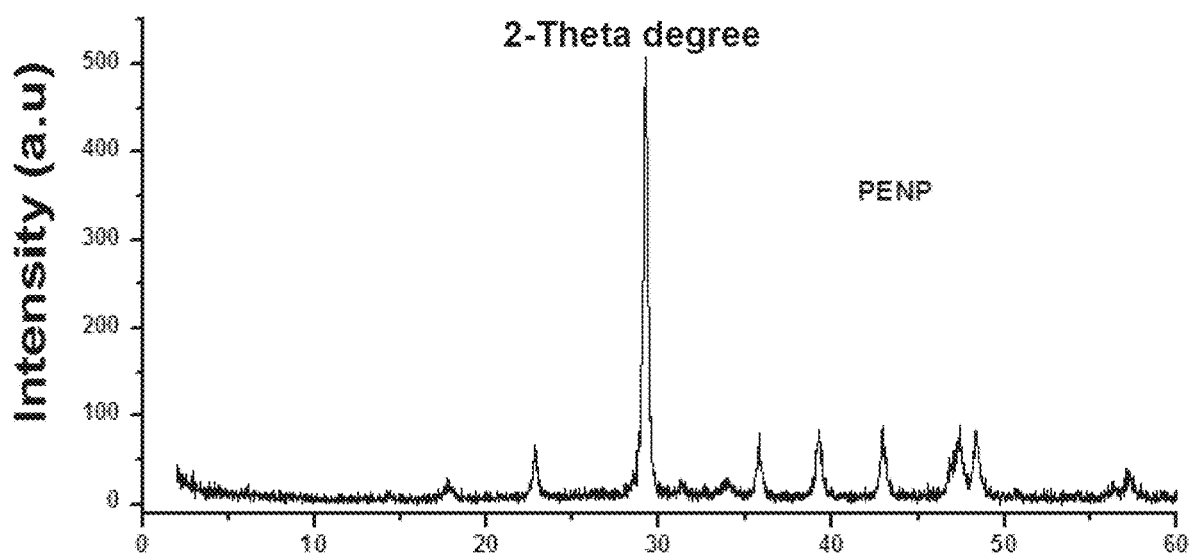
FIG. 3F: Xray diffraction pattern of PENP

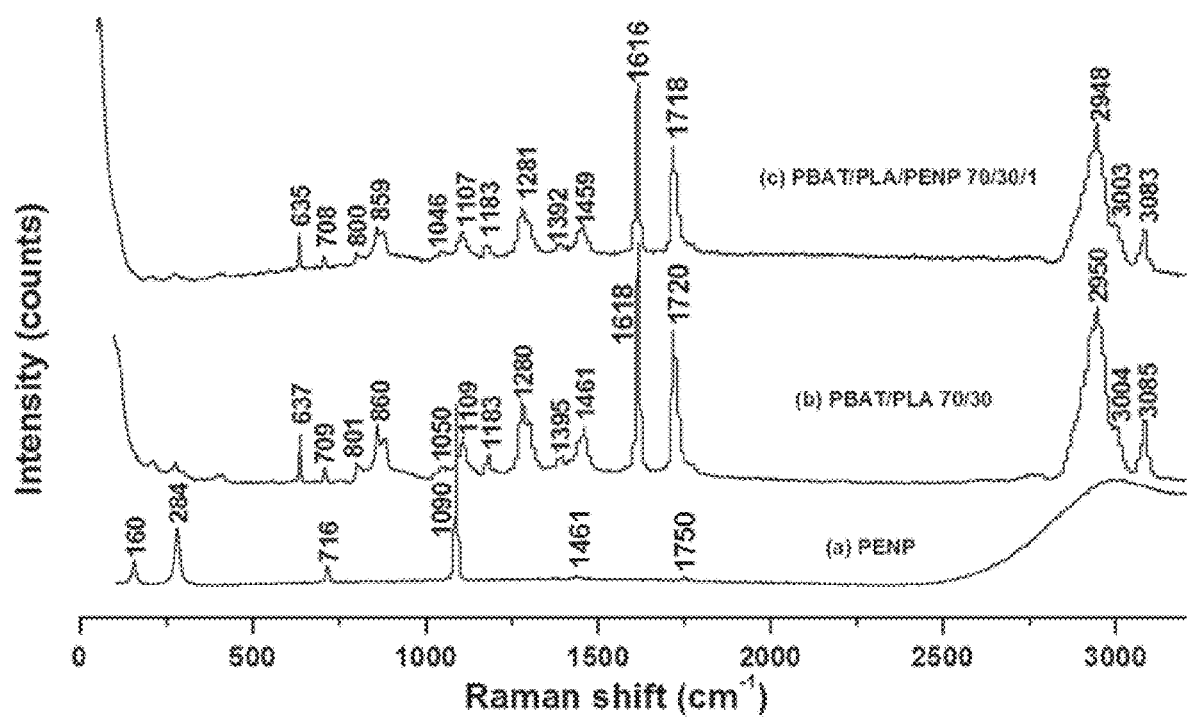
FIG. 4: Raman Spectra of PENP (a); Raman Spectra of PBAT/PLA 70/30 (b); and Raman Spectra of PBAT/PLA/PENP 70/30/1 (c)

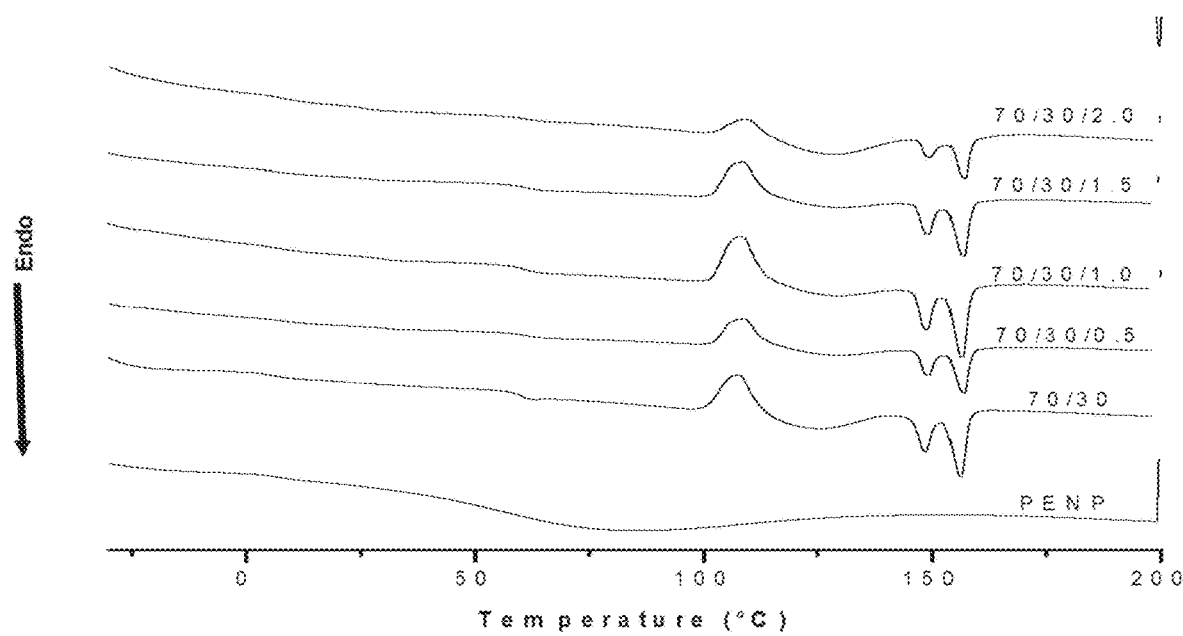
FIG. 5: DSC curves for PENP and PBAT/PLA/PENP blend composites

Thermal degradation of PENP and PBAT/PLA/PENP blend composites

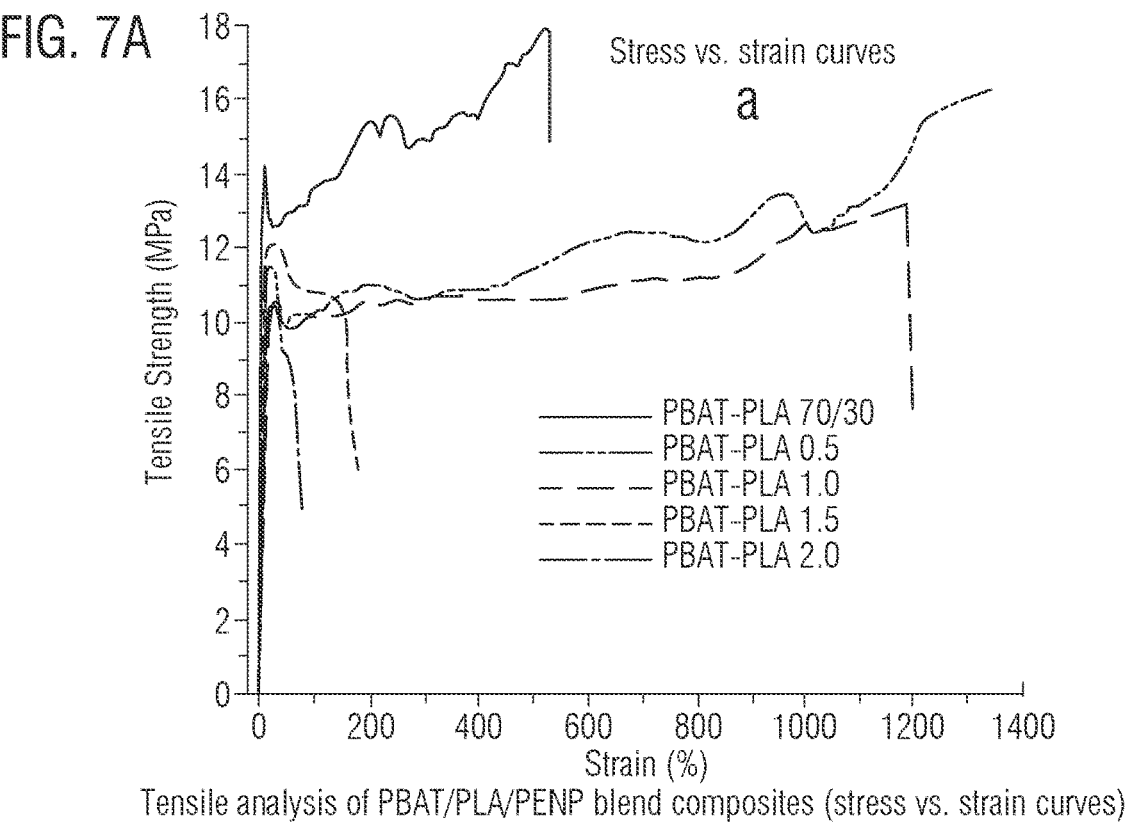
FIG. 7A Tensile analysis of PBAT/PLA/PENP blend composites (stress vs. strain curves)
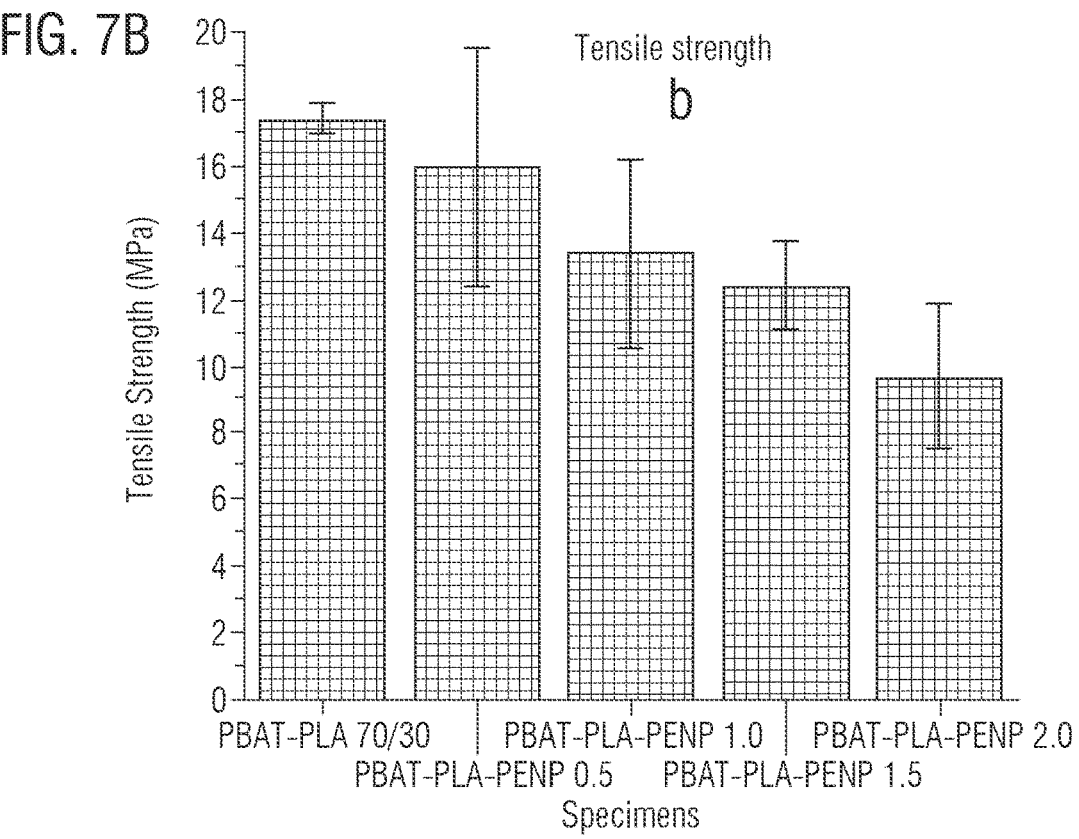
FIG. 7B Tensile analysis of PBAT/PLA/PENP blend composites (tensile strength)

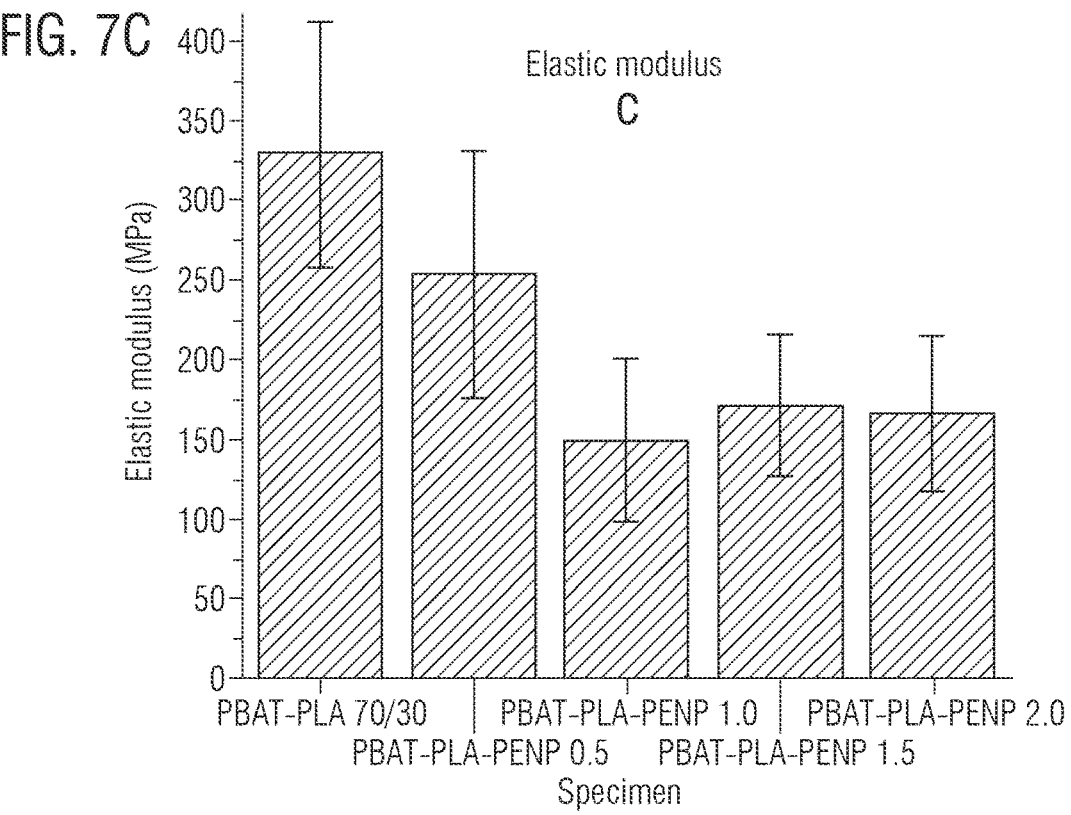
Tensile analysis of PBAT/PLA/PENP blend composites (elastic modulus)
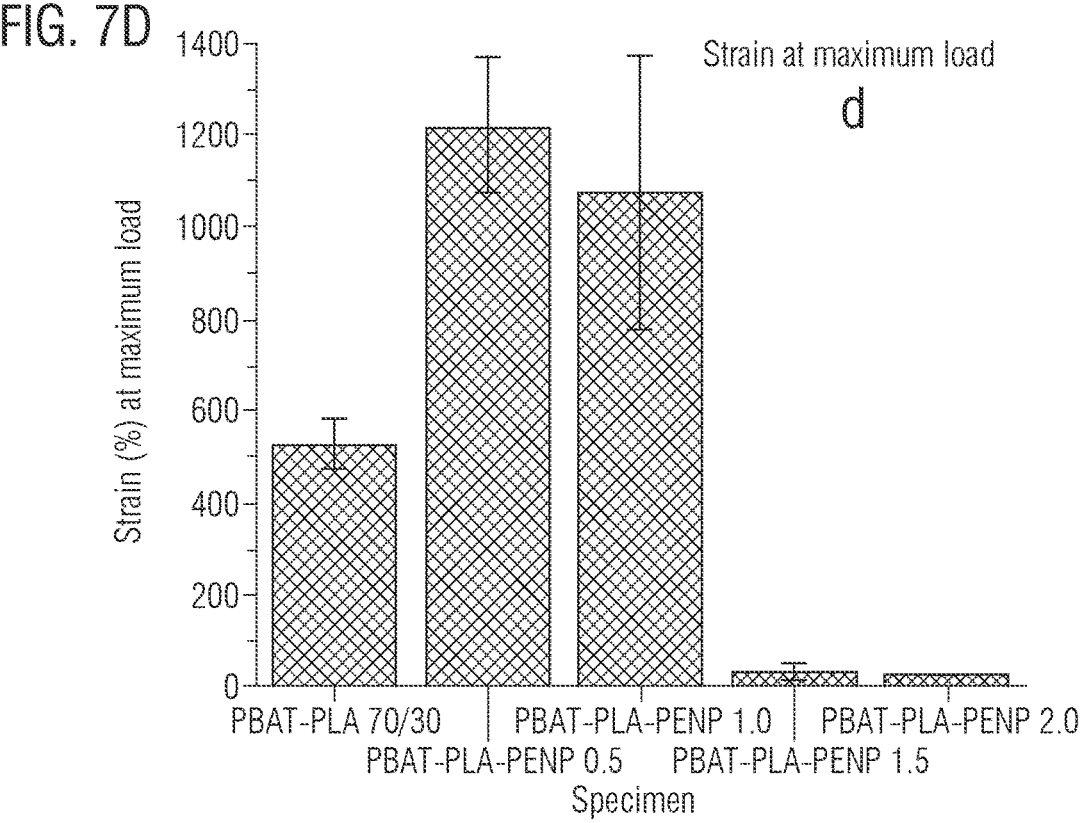
Tensile analysis of PBAT/PLA/PENP blend composites (strain at maximum load)

SEM micrographs of fractured surfaces after tensile analysis:

PBAT/PLA 70/30 low magnification high magnification

SEM micrographs of fractured surfaces after tensile analysis:

PBAT/PLA/PENP 70/30/1 low magnification high magnification

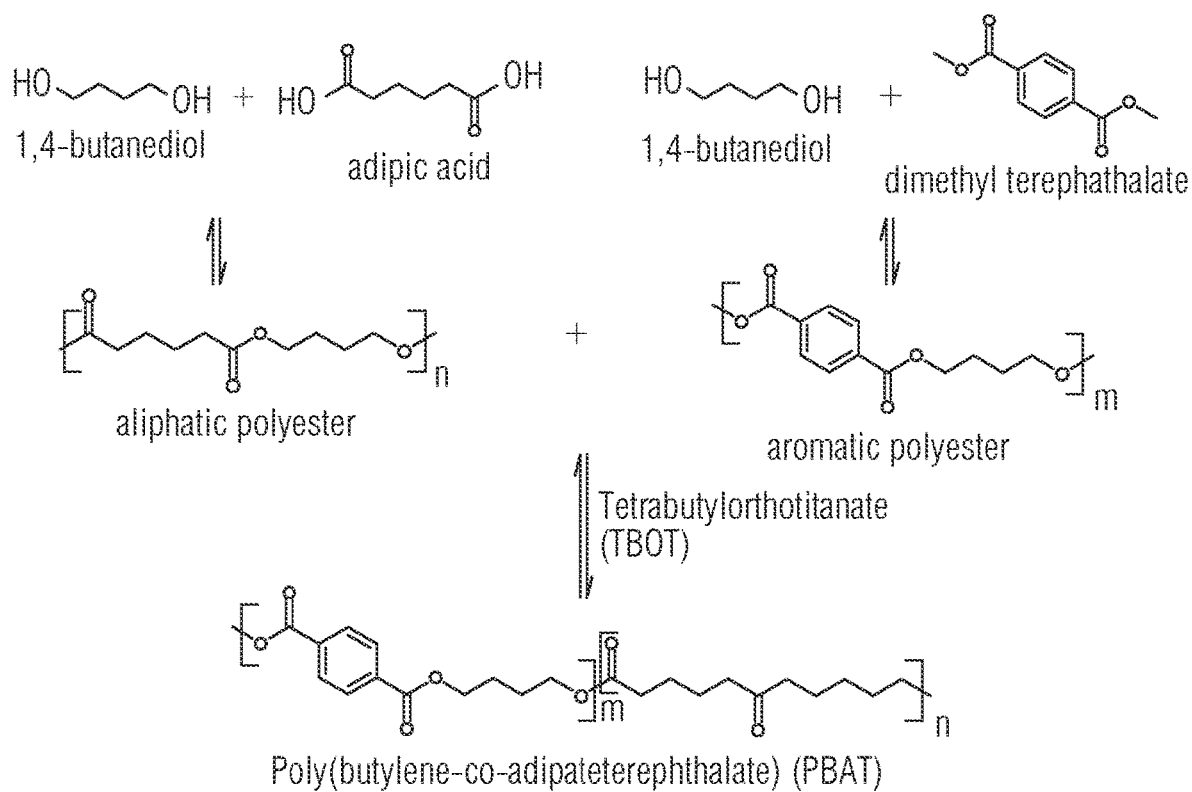
FIG. 9: PBAT Structure
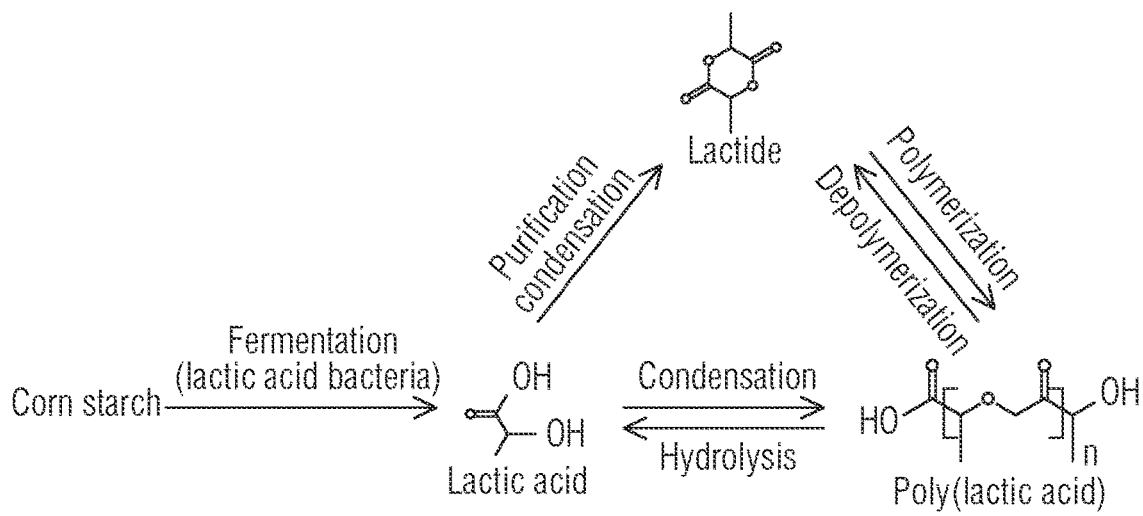
FIG. 10: PLA Structure

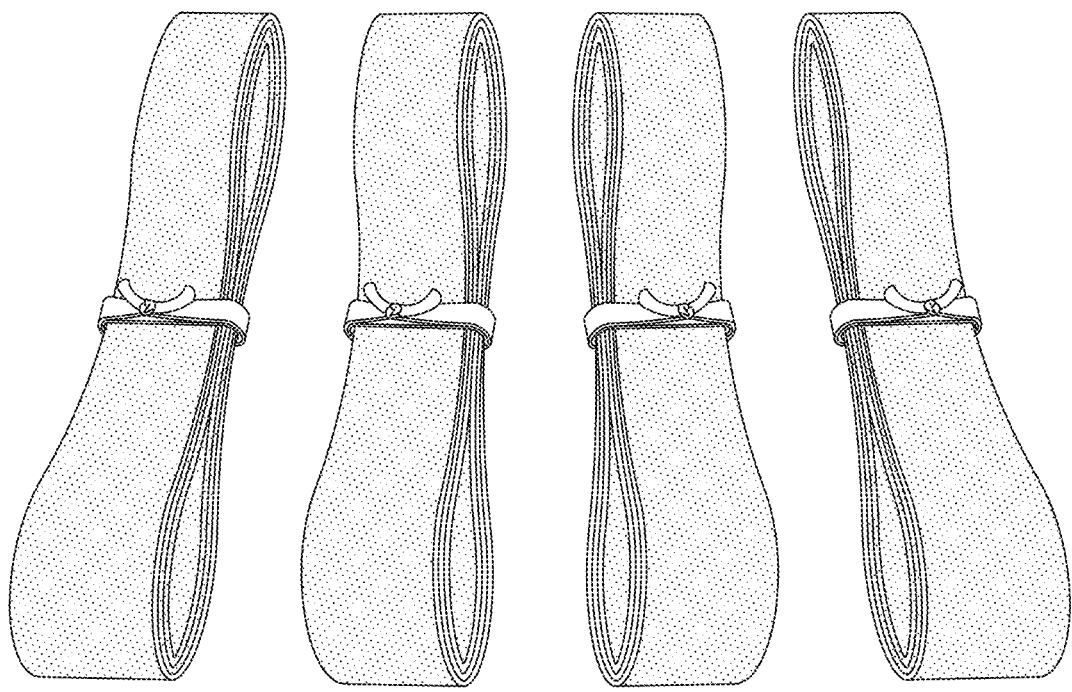
FIG. 11: Extruded polymer blend films

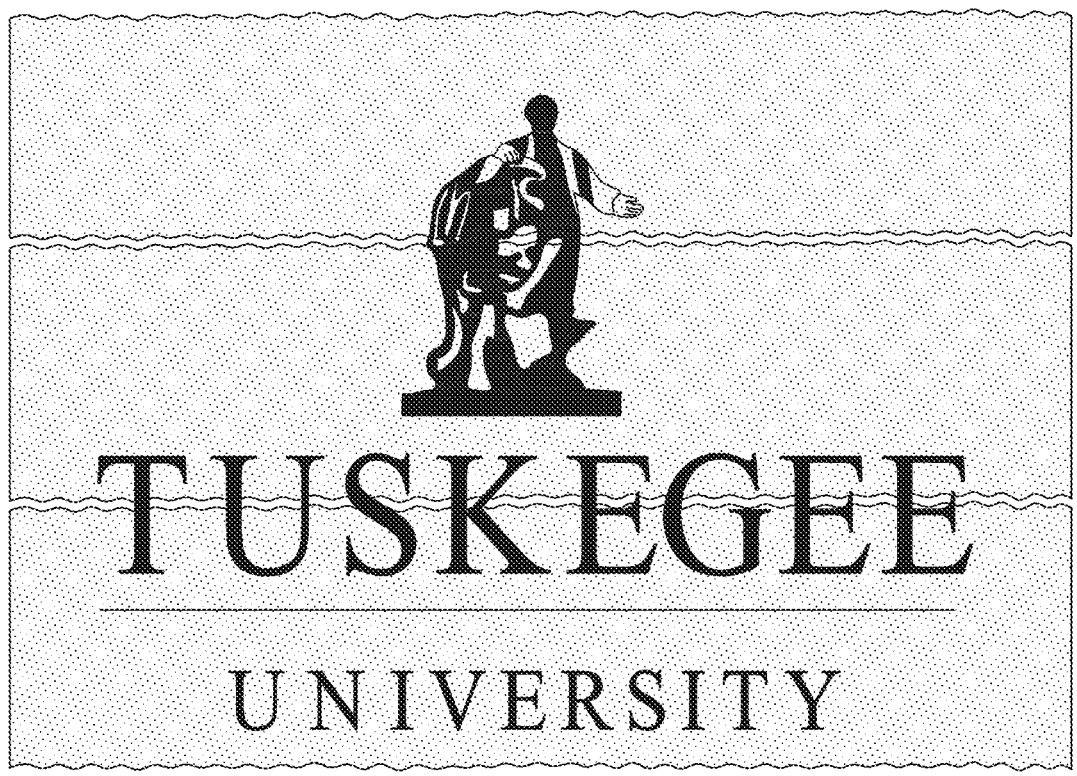
FIG. 12: 3D Printed polymer blend film

NANO ENGINEERED EGGSHELL FLEXIBLE BIOPOLYMER BLEND AND METHODS OF MAKING BIOPOLYMER BLEND FILM AND USING SUCH BIOPLASTIC BLENDS FOR IMPROVED BIODEGRADABLE APPLICATIONS

CROSS-REFERENCE TO RELATED APPLICATIONS

This application is a Divisional of U.S. application Ser. No. 16/040,250 filed Jul. 19, 2018, now U.S. Pat. No. 11,078,359 issued Aug. 3, 2021, which claims the benefit of U.S. Provisional Application No. 62/535,014 filed Jul. 20, 2017, the entirety of which is incorporated by reference.

STATEMENT REGARDING FEDERALLY SPONSORED RESEARCH OR DEVELOPMENT

This invention was made with government support under Contract No. NSF-RISE 1459007 awarded by National Science Foundation. The government has certain rights in the invention.

FIELD OF THE INVENTION

The present invention relates to flexible biopolymer blends, and specifically to a nano engineered eggshell flexible biopolymer blend, and more specifically to engineered proteinaceous eggshell nanoparticles blended with poly (butylene adipate-co-terephthalate)/polylactic acid to create flexible films and packaging components.

BACKGROUND

Biodegradable poly (lactic acid) (PLA) sourced from renewable resources has received attention in polymeric material design industry because of favorable characteristics, including a good degree of biodegradability, biocompatibility, high mechanical strength and excellent processability. Potential sources of PLA include a wide range of agriculture based renewable sources, such as corn starch, tapioca roots, chips or starch, or sugarcane. Due to its reasonable performance and availability in the market at a reasonable price, PLA has been considered a promising substitute to petroleum-based recalcitrant plastics in commercial applications, such as packaging and fiber materials. Deficiency in the ductility of PLA, however, significantly limits its use in applications such as in packaging and automotive industries. It is well-known in the material science and packaging industry that inferior durability and low thermal resistance are characteristics that hinder the broader use of PLA in these industries. Additionally, PLA exhibits extreme brittleness, with only a 5% fracture strain in tensile testing, which results in poor impact and tear resistance. A problem exists then from a structural design prospective, preventing the use of PLA as a promising substitute for petroleum source thin films and packaging components.

Attempts have been made to offset inferior PLA film properties, including the creation of PLA blends, such as Poly (lactic acid)/Poly (ether-b-amide) PLA/PEBA blends, PLA/PBAT blends, Poly (l-lactide) (PLLA) and poly (F-caprolactone) (PCL) PLLA/PCL blends, PLA/castor oil, PLA/PCL and Poly(lactic acid)-Poly(hydroxybutyrate) PLA/PHB. Desirable mechanical properties, however, were not achieved by any of these blends due to the immiscibility of the two chemically diverse polymers, thus thwarting efforts to blend these components. Further efforts were made to attain desirable properties or improved PLA film properties, including the compatibilization, or modification of the microstructure through the introduction of a third component, which is a common practice in polymer blending to increase stability of an immiscible blend of polymers. Although the use of nanomaterials has shown some promise in this regard, biopolymer blends using an economical and biocompatible naonmaterial has not been identified.

For example, polylactide/poly [(butylene succinate)-co-adipate] (PLA/PBSA)-organoclay composites were prepared via melt compounding in a batch mixer to determine the effect of clay on the properties of the blend. PLA/PBSA 70:30 blends with varied weight fractions of the organoclay (0 to 9%) were prepared and analyzed. Thermal analysis revealed that crystallinity was dependent on the clay content localized within the matrix of the composite. On the other hand, thermal stability slightly improved for composites with less than 2 wt. % clay content as against the deterioration observed in composites with clay content greater than 2 wt. %. Tensile analysis also revealed that a composite with 2 wt. % clay content possesses a slight improvement in elongation at break by 29% due to the alteration of the interfacial properties by the clay to favor ductility in the PLA/PBSA blends. Additional studies reported the effect of blending PLA/PCL with TiO2 nanofiller, including the effects on the thermal stability and degradation behaviors of the pristine and blended polymers. It was observed that nano-TiO2 preferentially aligned onto the PLA phase in the immiscible blend, due to large differences in the relative polarities between PLA and the TiO2 which led to low surface tension (2.0 mNm$^{-1}$) and high force of attraction between them. Also, improvement in thermal stability of the blend was observed, due to the action of nano-TiO2 as a fire retardant to impede combustion. The dynamic mechanical properties of PLA/PHBV, PLA/PCL and PHBV/PCL blends in the absence and presence of nano-TiO2 have also been evaluated. The storage modulus in the glassy region of the PHBV/PLA blend showed improvement over those of the pristine polymers with very minimal effects attributable to the nano-TiO2. This suggested partial interfacial miscibility between the two polymers. However, the dynamic mechanical analysis (DMA) for PLA/PCL and PHBV/PCL polymer blends show insignificant influence due to blending and nano-TiO2 inclusion. The reinforcing effects of eggshell particles have been investigated in some polymers and polylactic acid blends, however, blends with engineered proteinaceous eggshell nanoparticles (PENP) and the improved properties thereof have not been investigated.

Therefore, there still remains a need for a PLA-based biopolymer blend alternative to the PLA films that will result in an agriculture sourced PLA blend with improved properties such as greater heat resistance, durability, permeability. It would also be desirable to provide a biopolymer blend with improved compostability and biodegradability. The invention meets these needs.

SUMMARY OF THE INVENTION

A biopolymer blend is provided comprising a combination of three components: poly (butylene adipate-co-terephthalate)(PBAT); polylactic acid (PLA); and engineered proteinaceous eggshell nanoparticles (PENP).

Preferably, the amount of PENP is used between 0.5 to 2.0% wt of the biopolymer blend. The two polymer components a) and b) can be in any ratio blend but an approximate 70:30 ratio is preferred.

The polylactic acid is preferably derived from a renewable agriculture based source.

The engineered proteinaceous eggshell nanoparticles are preferable about 10-25 nm.

Also provided is a method of preparing biopolymer blend film. Poly (butylene adipate-co-terephthalate)(PBAT) and agriculture based polylactic acid (PLA) are mixed in chloroform to form a polymer blend and engineered proteinaceous eggshell nanoparticles are incorporated into the polymer blend to form a polymer nanoparticle blend. The polymer nanoparticle blend is extruded to form a biopolymer film.

Preferably the amount of polymer blend is a PBAT to PLA ratio of 70:30. Further, the amount of proteinaceous eggshell nanoparticles used in the polymer nanoparticle blend to form the biopolymer film is between 0.5 to 2% by weight of the polymer nanoparticle blend. The PBAT/agriculture sourced PLA blend that incorporates between 0.5 to 2.0% wt. of engineered proteinaceous eggshell nanoparticles (PENP) creates a miscible blend with improved thermal stability, flexibility, and durability.

A method of preparing a biopolymer blend packaging component is also provided. Poly (butylene adipate-co-terephthalate)(PBAT) and agriculture based polylactic acid (PLA) are mixed in chloroform to form a polymer blend and engineered proteinaceous eggshell nanoparticles are incorporated into the polymer blend to form a polymer nanoparticle blend. The polymer nanoparticle blend may be extruded to form a packaging component.

Preferably the amount of polymer blend in the method of preparing a packaging component is a PBAT to PLA ratio of 70:30. Further, the amount of proteinaceous eggshell nanoparticles used in the polymer nanoparticle blend to form the packaging component is between 0.5 to 2% by weight of the polymer nanoparticle blend that is useful to create flexible films and composites.

The invention also provides an agricultural sourced PLA-based blend that incorporates engineered proteinaceous eggshell nanoparticles (PENP) to create flexible films and packaging components and products. An additional benefit of using an engineered proteinaceous eggshell nanoparticle is to utilize eggshells as an economic source of nanoparticles that also reduces bio-waste. The inherent carboxylic groups from organic templates on which the eggshell crystals are deposited are well exposed to interact with materials with like functionalization, due to high surface areas. Poly (butylene adipate-co-terephthalate) (PBAT) and PLA are both polyesters, since these groups are compatible with the carboxylic groups in the eggshell particles, they can likely enhance the interfacial barrier between PBAT and PLA to improve structural integrity.

The invention also provides a PBAT/agriculture sourced PLA blend that incorporates engineered proteinaceous eggshell nanoparticles (PENP) with a nanoparticle size that is between 10-25 nanometers. Also provided is a method of making biopolymer films and packaging components derived from a PBAT/agriculture sourced PLA blend that incorporates engineered proteinaceous eggshell nanoparticles (PENP) with a nanoparticle size that is between 10-25 nanometers.

BRIEF DESCRIPTION OF THE DRAWINGS

FIGS. 2A-2C illustrate transmission electron micrographs of the synthesized PENP: FIG. 2A High magnification; FIG. 2B plate-like structure; and FIG. 2C low magnification analysis.

FIGS. 3A-F provide X-ray diffraction patterns of the following PLA blends: FIG. 3A PBAT/PLA 70/30; FIG. 3B PBAT/PLA/PENP 70/30/0.5; FIG. 3C PBAT/PLA/PENP 70/30/1; FIG. 3D PBAT/PLA/PENP 70/30/1.5; FIG. 3E PBAT/PLA/PENP 70/30/2; and FIG. 3F PENP.

FIG. 4 provides Raman spectra analysis of the following: line (a) shows the results for PENP; line (b) shows the results for PBAT/PLA 70/30 and line (c) shows the results for PBAT/PLA/PENP 70/30/1.

FIG. 5 provides differential scanning calorimeter (DSC) curves for PENP and PBAT/PLA/PENP blend composites.

FIGS. 7A-D provide tensile analysis of PBAT/PLA/PENP blend composites, including: FIG. 7A stress versus strain curves; FIG. 7B tensile strength; FIG. 7C elastic modulus; and FIG. 7D strain at maximum load.

FIG. 9 provides a PBAT structure.

FIG. 10 illustrates the process of making a PLA structure.

FIG. 11 includes examples of extruded polymer blend films.

FIG. 12 provides an example of a 3D printed polymer blend film.

DETAILED DESCRIPTION OF THE INVENTION

Figure 1:
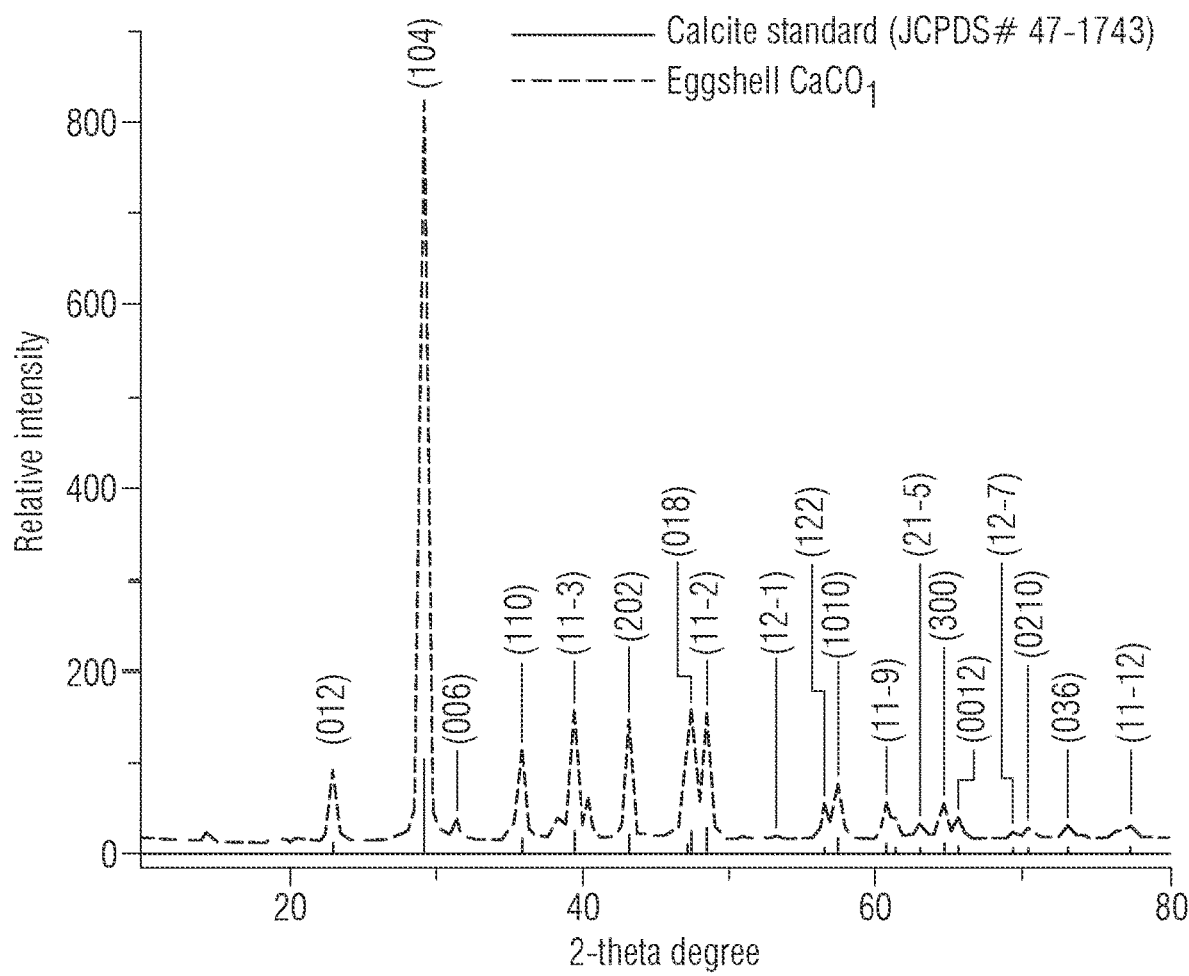
FIG. 1 illustrates an example of X-ray diffraction (XRD) pattern structural analysis of eggshell nanoparticles.

The invention described herein relates to a biopolymer blend comprising a combination of three components: poly (butylene adipate-co-terephthalate) (PBAT); polylactic acid (PLA); and engineered proteinaceous eggshell nanoparticles (PENP). This biopolymer blend has desirable characteristics, including increased thermal stability, increased tensile strength, and improved durability. If using a PBAT or PLA alone, the biopolymer is brittle and lacks desirable mechanical properties. Additionally, a PBAT/PLA blend creates an immiscible blend which also lacks the mechanical properties needed to create a flexible biopolymer blend. Specifically, a PBAT/PLA blend does not have tensile strength due to poor interaction between the phase separated polymers. Therefore a biopolymer blend that incorporates PENP results in a biopolymer/PENP blended composite with improved characteristics including increased thermal stability, tensile strength and durability.

The PBAT and PLA can be sourced from agricultural sources at low cost. PLA is derived from fermenting various sources of natural sugars from annually renewable agricultural crops such as corn, sugar beets, and sugarcane. Additionally, the synthesis of engineered proteinaceous eggshell nanoparticles (PENP) provides a use for chicken eggshell biowaste. Worldwide million tons of chicken eggshells are generated as biowaste daily. Each eggshell represents approximately 11% of the total weight of the egg and is comprised of three components: calcium carbonate (about 94%), organic matter (about 4%) and calcium phosphate (about 1%). In addition to being a plentiful and economic source of material, PENP made as described herein are relativity inexpensive to manufacture. Therefore, the combination of the inexpensive biopolymers with the synthesized PENP results in the production of an economical biopolymer film or biopolymer composite. Further, the resulting biopolymer film and biopolymer composite provides a positive environmental impact in that the biopolymer PENP blend is compostable and biodegradable.

The biopolymer blend may have two polymer components, poly (butylene adipate-co-terephthalate)(PBAT) and polylactic acid (PLA), in a 80:20, 70:30 or 50:50 ratio, preferably in a 70:30 ratio. The ratio may range from 90:10 to 50:50.

The amount of PENP incorporated into the biopolymer blend is between 0.5 to 2.0% wt of the biopolymer blend. The preferred amount PENP in the biopolymer may range from between 0.5 to 1.0%. The optimized amount of PENP incorporated into the blend is 2.0% of weight for significant crystal nucleation.

The biopolymer blend, including any of the preferred blends, may include colorants. Colorants used in the biopolymer blends may be used to add color to the films, to print bar coding or any other means of identification.

The biopolymer blends may also be formed as printed film or packaging components using 3D printing capabilities.

Engineering Proteinaceous Egg Shell Nanopowder (PENP)

Chicken eggshells with the inner protein layer (organic matter) were dried at room temperature for 48 hours and crushed using a mortar and pestle. Proteinaceous egg shell nanopowder (PENP) was prepared by a ball milling technique and followed by ultrasonic irradiation as described herein. The resulting engineered eggshell particles are in micron size and provide high surface areas. Preferably the proteinaceous egg shell nanopowder is comprised of particles are less than 100 nm in size, highly crystalline, irregular and porous. More preferably, the particles are between 10-25 nm in size. Further, the atomic arrangement of the PENP crystals is also a highly aligned pattern arrange single layers of plate-like structure(s). This arrangement allows the PENP to align between the biopolymer blend molecules, leading to enhancement of the composite mechanical properties.

In addition, the eggshell particles include carboxylic groups that are compatible with the biopolymers PBHAT and PLA, which are both polyesters. The PENP enhance the interfacial barrier between PBAT and PLA to improve structural integrity of the composite.

Biopolymer Blending

In order to enhance the bioflexibility and strength of PLA, blending can be carried out with poly(butylene adipate-co-terephthalate) (PBAT) to generate PBAT/PLA blend using conventionally accepted melt blending processes and solution blending, preferably melt blending is utilized. The PENP was mixed with the biopolymer blends to ensure homogenous distribution of the PENP throughout the biopolymer components using standard mixing methods as described herein and precipitated and vacuum filtered.

Extrusion of the Biopolymer Composite to Form Biopolymer Film

The precipitated biopolymer blends containing the dispersed PENP are formed into biopolymer films or components using standard extruder equipment. This extruder equipment contains thermostat control five heating zones and screw rotational speed to facilitate melting, mixing and the formation of continuous viscous melt for the extruded film. Optimum working temperatures were maintained at 320, 320, 320, 315 and 312° F., for the barrel and die zones. High barrel temperature are favorable to allow the polymer to melt and randomly orient the particulates within the flowing matrix whiles the screw rotation induces high velocity in the matrix, causing immense shear force which contributes to the random distribution of the particles. The biopolymer films are between 0.1-0.3 mm thick blend composite specimens.

The precipitated biopolymer blends containing the dispersed PENP are also formed into biopolymer films using 3D printer applications to create biopolymer films instead of traditional extruding methods.

The resulting biopolymer films or components have improved thermal stability or resistance to temperature induced degradation in the material, making these biopolymer films ideal with use in a wide range of industrial applications, including, but not limited, to food packaging, including vegetable packaging, food catering products, organic waste or trash bags, biodegradable diapers, and biomedical packaging.

EXPERIMENTS

The various experiments described herein illustrate the compositions and production of compostable poly (butylene adipate-co-terephthalate) (PBAT)/agriculture sourced polylactic acid (PLA) blend compositions, films and composites with 0.5-2.0% proteinaceous eggshell nanoparticles (PENP) for the production of enhanced biopolymer blended films and packaging components. These experiments also provide support for the effectiveness of PENP on the microstructure, thermal and tensile properties of biopolymer or bioplastic blends and components. Further, these experiments demonstrate an improved composition with improved characteristics that also has a positive environmental impact by utilizing eggshells, which are normally considered bio-waste.

Polymer Blend Materials and Method of Making Polymer Blends

Poly (butylene-co-adipate terephthalate) (PBAT) (Ecoflex F blend C 1200) and biopolymer GF-106-02 were obtained as a research samples from BASF Corporation, Villa Park, Ill., USA and Biotec GmbH & Co KG, Emerich, Germany respectively. Whiles the polylactic acid (PLA) (Ingeo™ biopolymer 3051D) was obtained from NatureWorks LLC, Minnetonka, Minn., USA. Eggshells were obtained from American dehydration foods Inc., Atlanta, Ga., and processed to eggshell nanoparticles. Chloroform ($CHCl_3$, ≥99%) used to dissolve the pelleted polymers and was of hplc grade, methanol ($CH_3OH$, ≥99.9%), used to precipitate the blend/PENP mixture, polypropylene glycol (PPG) used as a liquid medium for the ball milling of eggshells and denatured reagent grade ethanol ($CH_3CH_2OH$) used for washing the PPG and for ultra-sonication were all purchased from Sigma Aldrich, St. Louis, Mo.

Processing of Proteinaceous Eggshell Nanoparticles

Eggshells with the inner protein layer were dried as received at room temperature for 48 hours and crushed using a mortar and pestle. Proteinaceous egg shell nanopowder (PENP) was prepared by ball milling 5 grams of the micro particles in 10 mL of PPG with 8 steel balls (6 mm) using Spex Sample prep 8000D mixer/mill for 10 hours. The product was then washed 4 times with absolute $CH_3CH_2OH$ and centrifuged for 5 min at 15000 rpm (Allegra 64R, Beckman Coulter). The resulting product was again mixed with 50 mL of CH3CH2OH and magnetically stirred at 1200 rpm for 30 min, then ultrasound irradiated for 5 h (Sonics vibra cell ultrasound, Model WCX 750, Ti-horn 20 kHz, 100 W/cm$^2$) at 50% amplitude and 25° C. The PENP/CH3CH2OH suspension was then centrifuged at 15000 rpm. The supernatant was separated and the PENP vacuum-dried for 12 hours.

Incorporation of PENP into Biopolymer Blend Systems

In order to homogeneously mix the PENP with the polymer blend, 150 g of the 70/30 PBAT/PLA solution was blended in 500 mL of CHCl3 by magnetic stirring for at least 12 hour at 400 rpm on magnetic stirrer/hot plate (CIMAREC, Barnstead International). Specific amounts of the PENP was added to make 2, 1.5, 1.0 and 0.5 percent by weight of the blend was first dispersed in 60 mL CHCl3 on a magnetic stirrer (Sigma Aldrich, IKA WORKS, Inc.) at 600 rpm for 30 minutes before it was added to each melt blend and allowed to mix for an additional 4 hours. After this, the blends and the PENP were further homogenized by mechanical stirring for 5 minutes, before excess (800 mL) CH3OH was added in steps of 100 mL whiles mechanical stirring to precipitate the mixture into solid powder through a methanolysis process (breakdown of chloroform to release the polymer using methanol). After the precipitation, the mixture was allow for additional 2 hours to ensure complete methanolysis of chloroform before the powder was vacuum filtered (100 mm Whatman™) for 20 minutes and dried at 40° C. for 12 hours in an oven (Isotem 200 Series).

Extrusion of the Polymer Blend Composites

About 150 g of each of the precipitated blends containing the dispersed PENP was dried for 12 h at 140° F. in a hopper (DRI-AIR Industries Inc., model RH5). This was then fed into a19 mm (diameter) table top single screw extruder (Wayne SN: 8001) which is driven by 2 hp motor. Thermostat control five heating zones and screw rotational speed facilitated the melting, mixing and the formation of continuous viscous melt for the extrudate. Three heating zone are located in the barrel whiles two are in the die zone. The optimum working temperatures were maintained at 320, 320, 320, 315 and 312° F., for the barrel and die zones respectively. High barrel temperature causes the polymer to melt and randomly orient the particulates within the flowing matrix whiles the screw rotation induces high velocity in the matrix, causing immense shear force which contributes to the random distribution of the particles. About 40 mm wide and 0.1-0.3 mm thick blend composite specimens were obtained at a screw speed of 20 rpm and a feed rate of 4.4 g/minutes and collect at the die orifice. The continuous hot molten films were passed through water stationed at the orifice of the die for quenching. These blends were stored in a high vacuum desiccator (JOEL, EMDSC-U10A) and only removed during characterization as needed.

Characterization of the Polymer Blend Composites

Raman Analysis

Molecular vibrational spectroscopic analysis of the pristine and blended polymer systems was achieved through the use of DXR Raman microscopy (Thermo Scientific). This test was done using 532 nm laser (5.0 mW power), filter and grating. OMNIC Software was used for data acquisition and analysis. The essence in the vibrational analysis is to assist in the identification of functional groups identical to each pure polymer in the blend, any form of phase change and type of interactions occurring between the blend systems.

X-Ray Diffraction (XRD)

X-ray diffraction analysis was performed on all specimens, using a Rigaku diffractometer (DMAX 2100) equipped with Cu Kα radiation, operated at a step size of 0.02°, scan rate of 1°/minutes, 3° to 800 Braggs angle of diffraction and 40 kV to 30 mA.

Transmission Electron Microscopy (TEM)

Transmission electron microscope (TEM-Joel 2010) was used to determine the particle sizes and morphologies of the prepared PENP. One (1) mg of the ENP specimen was disperse Joel 2010 microscope d in 5 mL CH3CH2OH for 10 minutes in an ultrasonic bath and a drop of the colloidal solution was deposited on a copper grid for analysis.

Differential Scanning Calorimetry (DSC)

A TA Q 2000 differential scanning calorimeter (DSC) was used to study thermal profiles of the specimens. Samples of 10.0±0.1 mg were used in the test. Each sample was sealed in aluminum pan and the test run against an empty reference pan. Each specimen was cooled at 20.0° C./minutes from room temperature to −40° C. and subsequently heated from −40° C. to 200° C. at 5° C./minutes and held at constant temperature for 2.0 minutes to erase previous thermal history. It was again cooled from 200° C. to −40° C. at 20.0° C./minutes before finally scanning at 5.0° C./minutes from −40° C. to 200° C. to determine the various heat transitions in each specimen.

Thermogravimetric Analysis (TGA)

Thermogravimetric analysis was carried out with TA Q 500 equipment. Samples of 14±0.2 mg were place in platinum pans. An empty platinum pan was used as a reference. Each sample was heated from 30° C. to 600° C. in a 50 mL flow of N2. A heating rate of 5° C./minutes was used and the continuous records of sample temperature, mass, first derivative and heat flow were taken.

Tensile Testing

Measurement of tensile mechanical properties was performed using Zwick Roell Z2.0 mechanical testing system in accordance to ASTM D 882 using a crosshead speed of 500 mm/minutes and 2.5 kN load cells and wedge grips. Specimens were cut from the extruded sheets of polymer systems 19 mm×0.3 mm×120 mm. The test was conducted at 20 mm gauge length with TestXpert data acquisition and analysis software. At least 15 specimens were tested and averaged in to the reported mechanical properties.

Scanning Electron Microscopy (SEM)/Energy Dispersive Spectroscopy

Microstructure and blend morphologies were probed using Joel JSM-5800 Scanning electron microscopy (SEM). Film samples were cut and placed on a carbon tape on 4-in wide sample holder of the SEM. This was then sputter coated with gold-palladium for 5 minutes in Hummer 6.2 sputtering system purged with N2 gas and operated at 20 millitorr, 5 volts, and 15 milliamps. Fractured surfaces of the tensile specimens were examined using Hitachi S-3400N SEM and EDS analyses were done in the back scattering mode.

Transmission Electron Microscopy (TEM) and X-Ray Diffraction Results

Results of the X-ray Diffraction are shown in FIG. 1. In particular, FIG. 1 is the XRD pattern of the synthesized PENP and the standard file #47-743 of calcite from the Joint Committee for Powdered Diffraction (JCPDS) data base. The nature of the diffraction peaks suggests that the inorganic phase is highly crystalline with crystal sizes in the nanometer range due to the broader nature of the peaks.

FIG. 2 provides the results of the Transmission Electron Microscopy analysis. In particular, FIG. 2A shows that the particles are less than 100 nm (10-25 nm) in sizes, highly crystalline, irregular and porous. The crystallinity of the PENP is clearly provided in the crystal lattice shown in FIG. 2B. In addition, FIG. 2B. shows the atomic arrangement of the crystals in a highly aligned pattern arrange in layers of plate-like structure. This is important because the inorganic material can adopt this type of arrangement to align in between polymer molecules, leading to enhance in mechanical properties.

FIG. 3 shows the morphology of the blends and the pure systems analyzed by X-ray diffraction. Diffraction patterns of a PBAT/PLA 70/30 blend (FIG. 3A), PBAT/PLA 70/30 blend composites (FIG. 3B-E) and PENP (FIG. 3F) are provided. A semi crystalline diffraction pattern was observed, with five prominent crystalline peaks evidently distributed on the amorphous curve at 2θ°=15.8, 17.5, 20.0, 23.1, 24.3 and 29.3 in the 70/30 blend and the blend composites. The crystalline peaks are due to the presence of PBAT. PLA is amorphous, and merges with the amorphous region of PBAT. The composites, however, reveal the presence of the PENP, evident by the diffraction peak at 2θ°=29.4 at d (104)=4.416 nm crystal plane for calcite, the predominant mineral in eggshell crystals shown in FIG. 3F.

Similar diffraction patterns have been observed in a study for PBAT/PLA 60/40 and 40/60 blends. The retention of the semi crystalline nature of the PBAT in the blend, coupled with the crystalline PENP is very critical to morphology related structural properties of the blend, especially, stiffness and flexibility. Crystallinity has been found to alter mechanical properties of various polymer blends to improve their mechanical integrity.

Further, the addition of tiny shads of PENP in the matrix of the 70/30 blend has the potential to alter the blend morphology for further enhancement of the interfacial weakness in the immiscible blend. Past reports laid emphasis on the importance of nanoscale materials on the enhancement of inferior polymer properties.

Raman Analysis

Raman spectroscopy helps in the investigation of structure and interactions of molecules at the functional group level. This test helps in identifying the functional groups in the structure of the blend and assigning them to its individual components. FIG. 4 shows the micro-Raman spectra of (a) proteinaceous eggshell nanoparticles (PENP), (b) 70/30 PBAT/PLA and (c) 70/30/1 PBAT/PLA/PENP blends in the region of 3200 to 200 $cm^{-1}$ analyzed using 532 nm laser. It is evident that the vibrational bands for the binary blend (b) and the blend composite (c) are quite similar. The assignment of these bands for Raman spectra revealed that distinct vibrational frequencies due to PBAT in the blend appeared at 637, 3085, 1720, 1618, 1185 $cm^{-1}$. These are due to aromatic ring vibrations, aromatic —C—H stretching, —C=O stretching, aromatic —C=C and —C—O—C stretching in the structure of the soft PBAT polymer respectively. This conforms to the findings reported by other researchers. The rest of the bands in the blends are due to the PLA polyester. The bands at 709, and 860 $cm^{-1}$ are due to —C=O out-of-plane deformation and —C—COO stretching respectively. Also, 1050 and 1109 $cm^{-1}$ are ascribed to —C-CH3 and —COC—stretching whiles 1395 and 2950 $cm^{-1}$, are due to —CH3 symmetric deformation, 1461 and 3004 $cm^{-1}$ are attributed to —CH3 asymmetric deformation and 1290 $cm^{-1}$ is as a result of —CH bending in PLA. The spectrum for the PENP (FIG. 4a) reveals the existence of divalent metal ion, due to $Ca^{+2}$ at 160 and 284 $cm^{-1}$, C=O mode is at 716 $cm^{-1}$ and that due to the carbonate ion ($CO_3^{-2}$) is at 1090 $cm^{-1}$ as reported by other researchers. The identification of bands attributed to each individual polymer suggests that the interaction between the components of the blend is poor and that no new chemical bond is established among them. The vibrational frequencies of the blend composite general reveal a shift by ±1 to 2 $cm^{-1}$. This may be attributed to the effect of PENP on the molecular motion of the functional groups upon excitation.

Thermal Analysis/Differential Scanning Calorimetry (DSC) Results

Differential Scanning Calorimetry heating curves of PENP, PBAT/PLA 70/30 blend and the blend composite fabricated by incorporating 0.5 to 2 wt. % of PENP after crystallization from melts obtained at 5° C./minutes are shown in FIG. 5. The PLA in the blend displayed a glass transition temperature at 60.20° C., cold crystallization at 104.83° C. and a melting point at 148.75° C. with a shoulder at 156.48° C. Also, the PBAT revealed a melting point at 122.74° C. The curve for the PENP reveals an endotherm peak at about 80° C. This is probably due to the melting of the protein residues in the inner layer of the eggshell used to process the PENP. Comparing the curve in FIG. 5, It is evident that the cold crystallization temperature of PLA slightly shifted by about 2° C. higher in the blends with much broader peaks, indicating enhanced cold crystallizability of the PLA. It also imply that the PLA remained amorphous and was not able to crystallize during 20° C./minutes cooling rate, as observed by Jiang et al. (2006). However, the cold crystallization exotherm in the 70/30/2 biopolymer PENP blend appeared to have significantly reduced from those with 0.5-1.5% content of PENP. This is a sign of enhanced crystallization effect by the addition of 2% PENP in the blend. One study revealed that the addition of 0.3%, of N, N, N-tricyclohexyl-1, 3, 5-benzene-tricarboxylamide (TMC-328) nucleating agent into PLLA/PCL blend dramatically reduced the cold crystallization peak beyond detection, indicating that 0.3% TMC-328 could largely enhance the PLLA matrix in the blend compared to 0.1, 0.2, and 0.5% which were also tested. This implies that optimum concentration of a nucleating agent is needed to effect crystallization significantly. Also, two distinct melting temperatures were observed in the all the blends, attributable to the individual polymers, this affirms the immiscibility of the blends as revealed in the morphological analysis. Hence, 2% PENP in this study appears to be the optimum for significant crystal nucleation. It is also evident that high amount of PBAT lead to significant change in the PLA melting and shoulder peaks; suggesting the presence of new crystalline structure induced by PBAT. This binomial melting peak has been reported to be induced by the less perfect crystals which had enough time to melt and reorganize into crystals with higher structural perfection to re-melt at higher temperature.

Thermogravimetric Analysis

Figure 6:
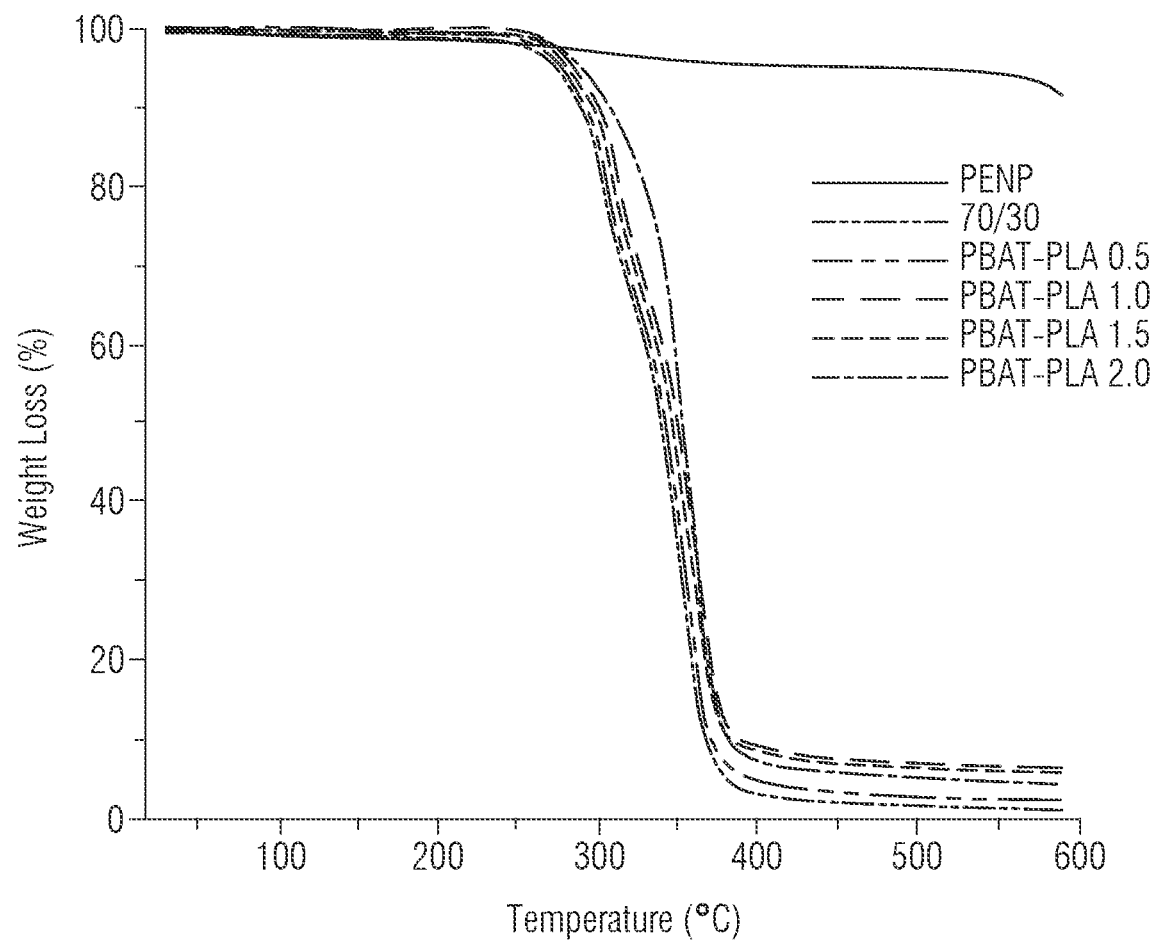
FIG. 6 illustrates thermal degradation analysis of PENP and PBAT/PLA/PENP blend composites.

FIG. 6 and Table 1 provides thermal stability as determined by thermogravimentric analysis of PLA, /PBAT polymer blend system and polymer blend composites. The amount of remaining material in the various neat blend (a 70:30 polymer blend without PENP) and different blends of PBAT and PLA polymers was used to determine the thermal stability or resistance to temperature induced degradation in a material. In FIG. 6, the PENP curve show remarkable thermal stability, about 96% of remaining materials up to 600° C. This slight change is due to the release of CO2 and the degradation of proteins in the eggshell based material.

The incorporation of PENP in the 70/30 blend led to significant improvement in the thermal stability. The following improvements were observed; onset of degradation, 16-46° C., $T_{d50}$, 5-13° C., $T_{dminutes}$, 3-7° C., $T_{dmax}$, 4° C. and residual yield of about 2-4% from the pure blend. These improvements are due to the influenced of thermally stable PENP embedded in the blend. As provided in Table 1, a small amount of PENP material included in the 70/30 blend as depicted in the residual yields in Table 1 led to improved thermal stability.

TABLE 1

Thermal Profiles of Pure and Blended PBAT/PLA/PENP Blend Systems

| Specimen | Onset Temp. | Td50 | Tdminutes | Tdmax | Residue (%) |
|---|---|---|---|---|---|
| PBAT/PLA 70/30 | 288.06 ± 5.88 | 341.52 ± 0.95 | 307.61 ± 1.43 | 355.59 ± 0.11 | 1.17 ± 0.37 |
| PBAT/PLA/PENP | 310.60 ± 1.36 | 348.04 ± 1.03 | 314.10 ± 0.65 | 358.43 ± 0.96 | 3.28 ± 1.03 |
| PBAT/PLA/PENP | 307.84 ± 2.77 | 347.36 ± 0.39 | 312.23 ± 1.45 | 358.94 ± 0.34 | 4.29 ± 1.50 |
| PBAT/PLA/PENP | 304.23 ± 2.84 | 346.23 ± 0.68 | 310.63 ± 1.00 | 358.80 ± 0.48 | 4.26 ± 1.32 |
| PBAT/PLA/PENP | 329.09 ± 0.85 | 354.56 ± 0.38 | — | 359.43 ± 0.51 | 4.61 ± 0.08 |

Mechanical Test Results
Tensile Analysis

FIG. 7 provides tensile analysis of both pure and binary blend polymer systems. In particular, FIG. 7a is the stress-strain curve representing the general mechanical behavior of the polymeric systems under tensile load of 2.5 KN. FIGS. 7B, 7C and 7D summarize the tensile strength, elastic modulus and strain at maximum load, respectively, of the pure and binary blend polymer systems. The pure PBAT/PLA 70/30 blend shows moderate ductility. FIG. 7A reveals that the pure polymer blend fails at about 526% strain. The incorporation of 0.5 and 1.0% of the PENP into the matrix of the blend shows an overwhelming increase in elongation with a strain (%) at maximum loads occurring at 1220 and 1078%, respectively. This is an improvement of about 695 to 552% for 0.5 and 1.0% of the PENP respectively compared to the pure blend. The blends also show distinct yielding followed by considerable cold drawing during the tensile test, indicating significant transformation of the microstructure to favor ductile fracture due to blending with the PENP. The addition of 1.5 and 2% significantly reduced the ductility of the blend to ~296 and 96% strain respectively as well as in elastic modulus. This is remarkably less than that of the pure blend, suggesting that the addition of higher concentrations of the PENP led to significant compromise in mechanical properties, due to the detrimental agglomeration effects of PENP in the matrix of the blend.

Fracture Surface Analysis

Figures 8A, 8B:
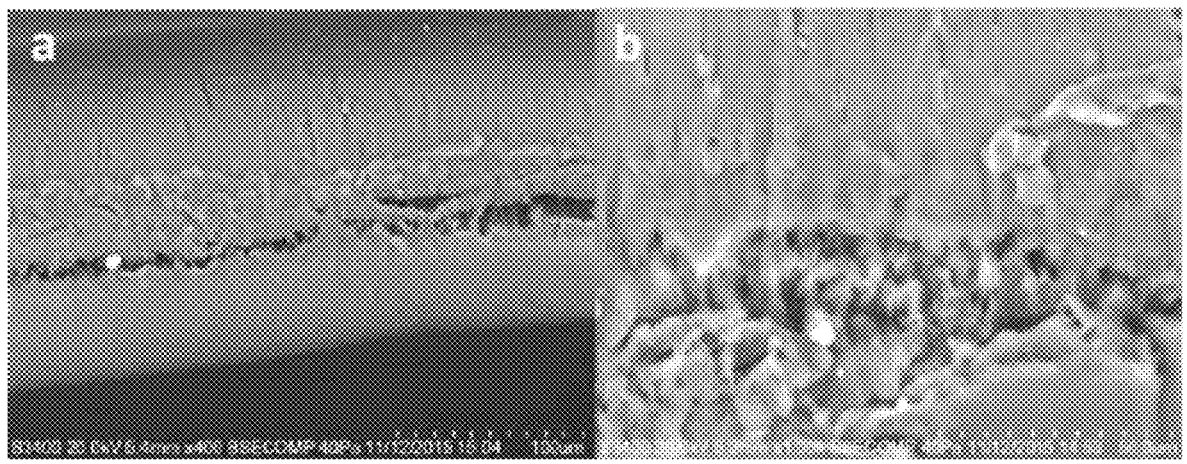
FIGS. 8A-D include scanning electron microscopy (SEM) micrographs of fractured surfaces after tensile analysis of PBAT/PLA 70/30 at FIG. 8A low and FIG. 8B high magnification and PBAT/PLA/PENP 70/30/1 at FIG. 8C low and FIG. 8D high magnification.
Figures 8C, 8D:
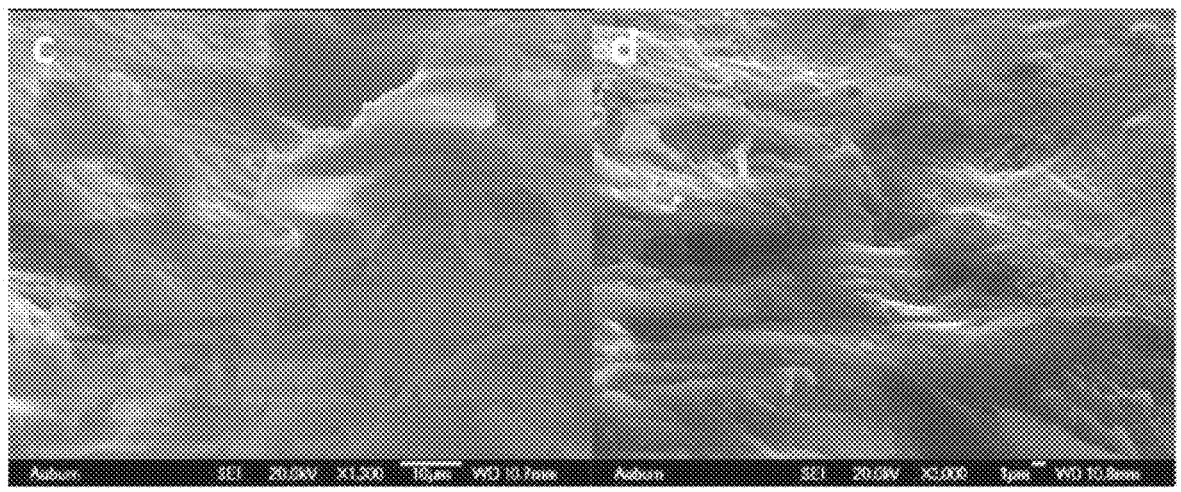

The toughening effect of PENP on the ternary composite was investigated through SEM analysis of the fractured surfaces after tensile tests are shown in the micrographs in FIG. 8. The fractured surface of the pure 70/30 PBAT/PLA polymer blend reveals a microstructure which suggests a pull out of one phase from another at the interface along the cross section of the fractured surface. The magnified micrograph (FIG. 8B) of this blend show a deep crack in this uninterrupted created as a result of the pull out and few ellipsoid phase segregations of PLA in PBAT matrix, affirming the immiscibility of the two polymers. This indicates that interfacial interacting is poor between the PBAT/PLA in the pure blend. However, as shown in FIGS. 8*c* and 8*d*, the fractured surface of the PBAT/PLAPENP ternary composite reveal an altered morphology on fractured surface rough and tortuous surface with discontinuous crack paths diverted around irregular fibrils of the matrix. This explains the enormous improvement in the durability of the PBAT/PLA composites with 0.5 and 1.0% content of PENP. The efficiency of an elastomer in toughening a polymer in a blend is highly dependent on the interfacial adhesion and cavitation. It is known that the interfacial interaction between the dispersed domains and the matrix play very delicate role in toughening the blend. High toughening effect is achieved when the dispersed phase favor strong interfacial interactions with the matrix to inhibit crack growth. The phase segregation in immiscible blend there helps in the toughening of the materials through crack path interruption to delay failure. This effect is more evident in the ternary composite than in the pure binary blends.

Results of PBAT/PLA Blended Film Study

Extruded compostable poly (butylene adipate-co-terephthalate) (PBAT)/agro-based polylactic acid (PLA) blend films and composites with 0.5-2.0% proteinaceous eggshell nanoparticles were studied to determine the effect of the PENP on the microstructure, thermal and tensile properties of on a biopolymer blend. The nanostructure of the PENP was determined by TEM analysis. The pure blend and composites were characterized using DSC, TGA, Raman spectroscopy, XRD, SEM and tensile testing. The DSC and SEM results revealed that the two polymers are immiscible, due to the presence of distinct melting points and phase segregated morphologies in the blend and composite structures. X-ray diffraction revealed that the PLA is amorphous whiles PBAT semicrystalline, resulting in a semi crystalline immiscible blend. Raman microspectroscopy showed frequency vibrations and intensities unique to the individual polymers in the pure binary blend and a slight shift in frequencies probably due to the effect of the PENP on the molecular vibrations of the functional groups in the polymers. The tensile test showed that the use of small amounts of PENP led to significant enhancement of the roughness of the ternary composite systems, with insignificant compromise in tensile strength. Also, SEM microanalysis of the fractured surfaces showed heterogeneous mixtures of the matrices with interrupt cracks paths to divert propagation and delay failure, leading to improvement in durability. The PBAT/PLA/PENP 70/30/0.5 ternary composite possesses the desirable balance, strength and flexibility for flexible designs and applications.

The various preferred embodiments and experiments having thus been described, those skilled in the art will readily appreciate that various modifications and variations can be made to the aforementioned preferred embodiments without departing from the spirit and scope of the invention. The invention thus will only be limited to the claims as ultimately granted.

The invention claimed is:

1. A method of preparing biopolymer blend film, the method comprising:
    a) dissolving poly (butylene adipate-co-terephthalate) (PBAT) and agriculture based polylactic acid (PLA) in chloroform to form a polymer blend;
    b) incorporating engineered proteinaceous eggshell nanoparticles (PENP) into the polymer blend to form a polymer nanoparticle blend;
    c) precipitating and vacuum filtering the polymer nanoparticle blend to form a precipitated polymer nanoparticle blend; and
    d) extruding the precipitated polymer nanoparticle blend to form a biopolymer film.

2. The method of claim 1, wherein the PBAT to PLA ratio is a 70:30 ratio.

3. The method of claim 1, wherein an amount of the PENP is used at between 0.5 to 2% by weight of the polymer nanoparticle blend.

4. The method of claim 3, wherein the PENP are between the size of 10-25 nanometers.

5. The method of claim 1, wherein the PENP are crystalline, irregular and porous.

6. The method of claim 1, wherein the PLA is derived from a renewable agriculture based source.

7. The method of claim 6, wherein the renewable agriculture based source is at least one of corn, corn starch, tapioca roots, tapioca chips, tapioca starch, sugar beets, and sugarcane.

8. The method of claim 1, wherein an amount of the PENP is used at between 0.5 to 1% by weight of the polymer nanoparticle blend.

9. A method of preparing a biopolymer blend packaging component, the method comprising:
   a) dissolving poly (butylene adipate-co-terephthalate) (PBAT) and agriculture based polylactic acid (PLA) in chloroform to form a polymer blend;
   b) incorporating engineered proteinaceous eggshell nanoparticles (PENP) into the polymer blend to form a polymer nanoparticle blend;
   c) precipitating and vacuum filtering the polymer nanoparticle blend to form a precipitated polymer nanoparticle blend; and
   d) extruding the precipitated polymer nanoparticle blend to form a biopolymer component.

10. The method of claim 9, wherein the PBAT to PLA ratio is a 70:30 ratio.

11. The method of claim 9, wherein an amount of the PENP is used at between 0.5 to 2% by weight of the polymer nanoparticle blend.

12. The method of claim 9, wherein the PENP are between the size of 10-25 nanometers.

13. The method of claim 9, wherein the PENP are crystalline, irregular and porous.

14. The method of claim 9, wherein the PLA is derived from a renewable agriculture based source.

15. The method of claim 14, wherein the renewable agriculture based source is at least one of corn, corn starch, tapioca roots, tapioca chips, tapioca starch, sugar beets, and sugarcane.

16. The method of claim 9, wherein an amount of the PENP is used at between 0.5 to 1% by weight of the polymer nanoparticle blend.

* * * * *